US010199863B2

(12) United States Patent
Carlson

(10) Patent No.: US 10,199,863 B2
(45) Date of Patent: Feb. 5, 2019

(54) DYNAMIC CURTAILMENT OF AN ENERGY GENERATION SYSTEM

(71) Applicant: SolarCity Corporation, San Mateo, CA (US)

(72) Inventor: Eric Daniel Carlson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 410 days.

(21) Appl. No.: 14/741,327

(22) Filed: Jun. 16, 2015

(65) Prior Publication Data

US 2016/0334848 A1 Nov. 17, 2016

Related U.S. Application Data

(60) Provisional application No. 62/162,481, filed on May 15, 2015.

(51) Int. Cl.
*H02J 13/00* (2006.01)
*H02J 3/38* (2006.01)
(Continued)

(52) U.S. Cl.
CPC .......... *H02J 13/0006* (2013.01); *H02J 3/381* (2013.01); *H02J 3/383* (2013.01); *H02J 3/32* (2013.01);
(Continued)

(58) Field of Classification Search
CPC ........................................................ G06F 1/28
See application file for complete search history.

(56) References Cited

U.S. PATENT DOCUMENTS 5,790,536 A * 8/1998 Mahany .............. B60R 16/0231
235/462.15
6,115,676 A * 9/2000 Rector ................... G01D 4/004
324/103 R
(Continued)

FOREIGN PATENT DOCUMENTS

CN 103094902 A 5/2013
WO 2012171532 A2 12/2012

OTHER PUBLICATIONS

Microsoft Corporation, "Patterns & Practices, proven practices for predictable results", Jun. 2004, Retrieved from the Internet at "https://msdn.microsoft.com/en-us/library/ff647328.aspx".*
(Continued)

*Primary Examiner* — Mohammad Ali
*Assistant Examiner* — Kelvin Booker
(74) *Attorney, Agent, or Firm* — Kilpatrick Townsend & Stockton LLP

(57) ABSTRACT

Techniques for curtailing a power generation system utilizing a message bus may be provided. Power generation data of a message bus system associated with an energy generation system may be subscribed to over a network. The message bus system may be configured to manage messages between the energy generation system, a system load metering device, and/or a server computer. The power generation data of the energy generation system may be received from the message bus system. In some examples, a control signal may be generated to curtail an overgeneration condition of the energy generation system based at least in part on the received power generation data when the overgeneration condition is occurring. The control signal may be published to the message bus system for communication to the energy generation system.

17 Claims, 8 Drawing Sheets

(51) Int. Cl.
*H02J 7/35* (2006.01)
*H02J 3/32* (2006.01)
*H02J 3/00* (2006.01)

(52) U.S. Cl.
CPC .............. *H02J 3/382* (2013.01); *H02J 7/35* (2013.01); *H02J 13/002* (2013.01); *H02J 13/0062* (2013.01); *H02J 13/0075* (2013.01); *H02J 13/0079* (2013.01); *H02J 2003/007* (2013.01)

(56) References Cited

U.S. PATENT DOCUMENTS

| | | | | |
|---|---|---|---|---|
| 6,122,603 | A * | 9/2000 | Budike, Jr. | G01D 4/004 340/870.02 |
| 6,311,105 | B1 * | 10/2001 | Budike, Jr. | G01D 4/004 700/291 |
| 7,930,070 | B2 | 4/2011 | Imes | |
| 8,301,311 | B2 | 10/2012 | Nelson | |
| 8,751,036 | B2 | 6/2014 | Darden, II et al. | |
| 9,310,864 | B1 * | 4/2016 | Klein | G06F 1/26 |
| 9,696,696 | B2 * | 7/2017 | Obrist | G05B 13/0245 |
| 9,811,064 | B2 * | 11/2017 | Carlson | H02J 3/383 |
| 2002/0078126 | A1 * | 6/2002 | Higgins | H04Q 11/0478 709/200 |
| 2004/0117330 | A1 * | 6/2004 | Ehlers | F24F 11/0012 705/412 |
| 2005/0144437 | A1 * | 6/2005 | Ransom | G06F 1/28 713/151 |
| 2006/0071776 | A1 * | 4/2006 | White, II | H02J 13/0086 340/538 |
| 2007/0002771 | A1 * | 1/2007 | Berkman | H04B 3/542 370/257 |
| 2007/0043478 | A1 * | 2/2007 | Ehlers | F24F 11/0012 700/276 |
| 2008/0052253 | A1 * | 2/2008 | Edwards | G01D 4/002 705/412 |
| 2008/0074284 | A1 * | 3/2008 | Edwards | G01D 4/002 340/870.02 |
| 2010/0076615 | A1 * | 3/2010 | Daniel | F03D 9/00 700/293 |
| 2010/0286841 | A1 * | 11/2010 | Subbloie | G06F 1/28 700/295 |
| 2011/0178643 | A1 * | 7/2011 | Metcalfe | F24D 19/1006 700/276 |
| 2011/0221280 | A1 | 9/2011 | Delmerico et al. | |
| 2011/0320834 | A1 * | 12/2011 | Ingels | G06F 1/266 713/310 |
| 2012/0004780 | A1 * | 1/2012 | Miller | F24J 2/38 700/286 |
| 2012/0078547 | A1 * | 3/2012 | Murdoch | G01D 4/004 702/62 |
| 2012/0080944 | A1 * | 4/2012 | Recker | H02J 9/02 307/25 |
| 2012/0281444 | A1 * | 11/2012 | Dent | H02M 1/32 363/56.01 |
| 2013/0035802 | A1 * | 2/2013 | Khaitan | G06F 1/263 700/297 |
| 2013/0162215 | A1 * | 6/2013 | Cooper | G05B 15/02 320/127 |
| 2013/0166084 | A1 | 6/2013 | Sedighy et al. | |
| 2014/0236508 | A1 * | 8/2014 | McGowan | G01R 21/133 702/62 |
| 2014/0278332 | A1 * | 9/2014 | Grammatikakis | H02S 50/00 703/18 |
| 2014/0297206 | A1 * | 10/2014 | Silverman | G01R 22/063 702/58 |
| 2014/0303784 | A1 * | 10/2014 | Obrist | G05B 13/0245 700/275 |
| 2015/0097697 | A1 * | 4/2015 | Laval | H04L 69/03 340/870.02 |
| 2015/0331972 | A1 * | 11/2015 | McClure | H02S 10/00 703/2 |
| 2016/0013643 | A1 * | 1/2016 | Park | H02J 3/00 713/300 |
| 2016/0118793 | A1 * | 4/2016 | Davis | H04L 12/282 700/295 |
| 2016/0315475 | A1 * | 10/2016 | Carlson | H02J 3/383 |
| 2017/0078922 | A1 * | 3/2017 | Raleigh | H04W 28/10 |
| 2017/0134182 | A1 * | 5/2017 | Davis | H04L 12/2829 |

OTHER PUBLICATIONS

Klein, Stanley A.; "Accomodating Wind Power Variability by Real-Time Adjustment of Controllable Loads"; IEEE; 2008; DOI: 10.1109/PES.2008.4596820; 5 pages.

Chen, Jianhua et al.; "An Active Power Real-time Control Method for Large Power Grid Under Wind Power Curtailment"; Proceedings of the CSEE (Chin. Soc. For Elec. Eng.); Oct. 5, 2012; vol. 32, No. 28; 6 pages.

* cited by examiner

DYNAMIC CURTAILMENT OF AN ENERGY GENERATION SYSTEM

CROSS-REFERENCES TO RELATED APPLICATIONS

The present application claims the benefit of and priority to U.S. Provisional Application No. 62/162,481, filed May 15, 2015, the entire contents of which is incorporated herein by reference for all purposes. Additionally, the present application is related to U.S. Provisional Application No. 62/119,925, filed on Feb. 24, 2015 and co-pending U.S. patent application Ser. No. 14/527,553, filed Oct. 29, 2014, entitled "Power Management Message Bus System," the entire contents of each is incorporated herein by reference for all purposes.

BACKGROUND

In recent years, climate awareness and the cost of energy has increased to the point that many consumers have begun to install renewable energy generation systems at both residential and non-residential locations. Solar photovoltaic (PV) systems, for example, have become relatively popular. Often, the PV systems will be "grid-tied," in that it is connected to the utility-maintained electrical system (i.e., "the greater grid"). In many ways, this can be a benefit to the greater grid and/or the consumer. However, this can also pose technological and/or safety challenges, for example, when the output of the PV systems becomes greater than that desired by the greater grid.

BRIEF SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to one embodiment, a method for dynamically curtailing power production (e.g., during an overgeneration of power) of an energy generation system may be executed by a server computer. In some examples, the method may include implementing or otherwise managing, by the server, a message bus system that is coupled to an energy generation system and a system load metering device, where the message bus system is configured to transmit messages between at least one of the energy generation system, the system load metering device, or the server. Additionally, the method may include subscribing, with the message bus system, to real-time power generation data of the energy generation system. In some aspects, the method may include receiving, from the message bus system, the real-time power generation data of the energy generation system. Additionally, the method may include determining, based at least in part on the real-time power generation data of the energy generation system, if the energy generation system is experiencing an overgeneration condition, where the overgeneration condition is occurring when the energy generation system produces more power than is required by a system load corresponding to the system load metering device. The method may also include generating a dynamic control signal to curtail the overgeneration condition based at least in part on the real-time power generation data. In some examples, the method may also include providing, to the message bus system, the dynamic control signal for transmission to the energy generation system. The method can include receiving, from the message bus system, information that indicates that the system load metering device has detected a period of time when the system load is below a threshold corresponding to an amount of power provided by the energy generation system. In some aspects, the method can also include receiving, from the message bus system, an amount of power required by the system load for the period of time. In some examples, the dynamic control signal may be provided to the message bus system for curtailing the overgeneration of power during the period of time. Further, the dynamic control signal may be configured to instruct a power generation asset of the one or more energy generation systems to decrease power production and an amount of the decrease may be based at least in part on the system load.

According to another embodiment, a system may include a server computer with a processor configured to execute computer-executable instructions, stored in a memory of the server computer to subscribe, via a network, to power generation data of a message bus system associated with an energy generation system, where the message bus system may be configured to manage messages between at least one of the energy generation system, a system load metering device, or the server computer. In some aspects, the system may also receive, from the message bus system, the power generation data of the energy generation system. The system may also be configured to generate, by the server computer, a control signal configured to curtail an overgeneration condition of the energy generation system based at least in part on the power generation data when the energy generation system is experiencing the overgeneration condition. In some examples, the system may publish, to the message bus system, the control signal for communication to the energy generation system.

In some examples, the power generation data may correspond to an asset of the energy generation system. The control signal may be further configured to instruct the asset to decrease an amount of power generation. The asset may be configured to control power generation of the energy generation system and the asset may comprise a photovoltaic inverter. In some examples, the network may comprise at least one of a wireless network, a wired network, or a power line network. In some examples, the system may also determine, based at least in part on the power generation data of the energy generation system, whether the energy generation system is experiencing the overgeneration condition. In some cases, the overgeneration condition may occur when the energy generation system produces more power than is required by a system load corresponding to the system load metering device. Additionally, the system may also receive an amount of power that is required by the system load. Further, the message bus system may receive the power generation data of the energy generation system from a gateway device that collects the power generation data from at least the subset of the plurality of energy generation systems, and in some cases, the gateway device may be capable of receiving the power generation data via a wireless interface of the network.

In another embodiment, a computer-readable storage medium may be configured to store computer-readable instructions that, when executed by one or more processors, configure the one or more processors to perform operations. In some examples, the operations may include subscribing, with a message bus system configured to manage messages between at least one of an energy generation system, a system load metering device, or the server, to real-time power generation data of the energy generation system. The operations may also include receiving, from the message bus system, the real-time power generation data of the energy generation system. Some operations may include determining, based at least in part on the real-time power generation data of the energy generation system, whether the energy generation system is experiencing an overgeneration condition. Additionally, in some cases, the operations may include generating, by the server, a control signal configured to curtail the overgeneration condition based at least in part on the real-time power generation data if the energy generation system is experiencing the overgeneration condition. The operations may also include publishing, to the message bus system, the dynamic control signal for transmission to the energy generation system. In some aspects, the overgeneration condition may occur when the energy generation system produces more power than is required by a system load corresponding to the system load metering device. Further, in some cases, the operations may also include providing the message bus system for subscription to at least one of the energy generation system or the system load metering device.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
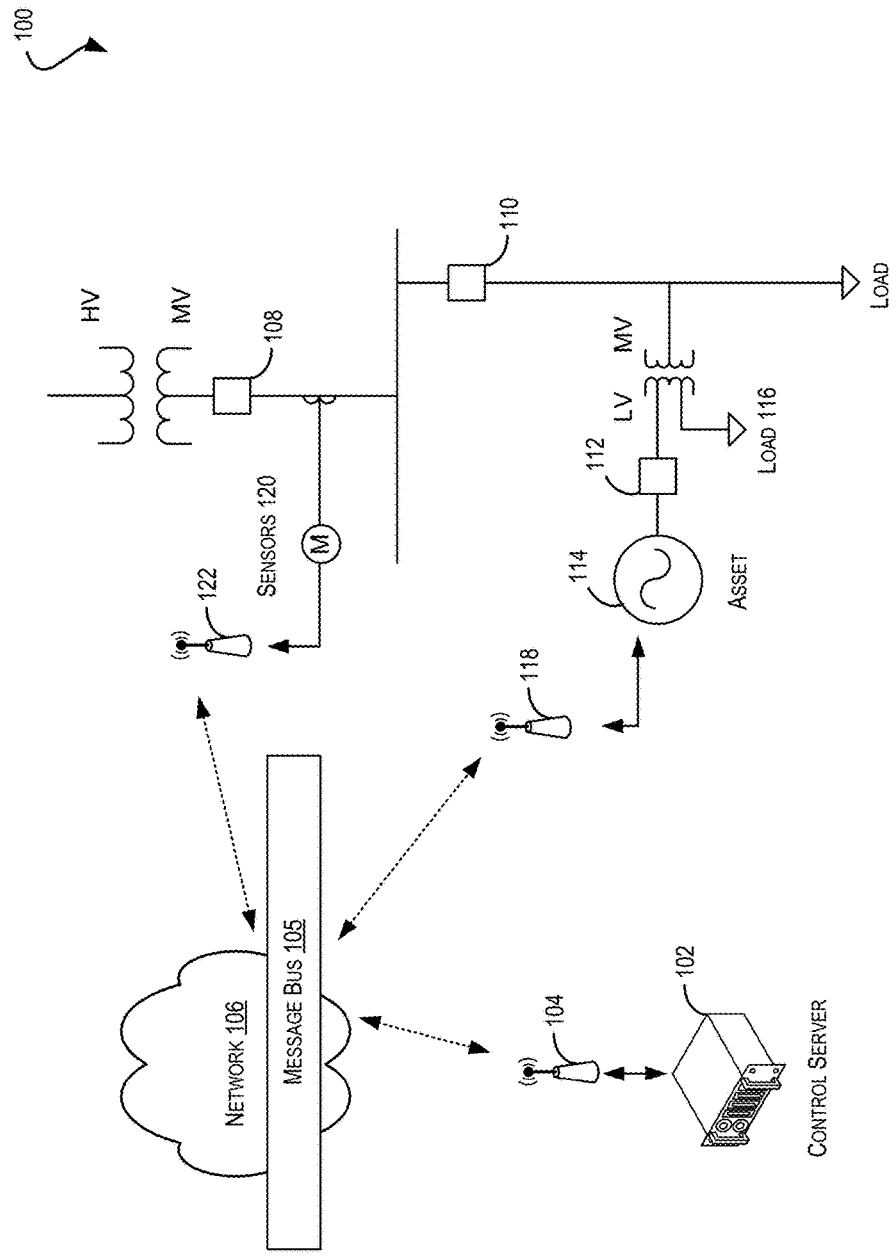
FIG. 1 is a simplified block diagram illustrating an example architecture and environment for dynamic curtailment of an energy generation system as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples of the present disclosure are directed to, among other things, dynamically curtailing assets of a distributed generation management system via a message bus, for example, controlling a distributed power generation management system that utilizes a message bus. In particular, a distributed power generation management system may include one or more distributed power generation nodes or elements, interconnected to form a grid framework, within a segment or location. For example, a segment may include a single site (e.g., a residential or commercial location with one or more nodes), a group of sites, a neighborhood, a compound, a group of neighborhoods serviced by a single utility substation, or the like. In any event, the present disclosure may be directed to the real-time curtailment of each (or of a subset of each) distributed power generation node within the segment. Further, curtailment instructions configured to enable the real-time curtailment may be communicated with the power generation nodes via a message bus. In other words, the present disclosure may enable maintenance of a net behavior across an entire segment of a grid or of the entire grid itself in a real-time and decoupled manner. In some examples, curtailment may include causing a controllable energy generation system (e.g., a solar power generation node or the like) to produce less power than it is capable (i.e., an amount of power below the node's capability). Alternatively, or in addition, curtailment may be achieved by charging a battery (e.g., causing increased net load) or activating a controllable load (e.g., turning on a hot water heater or other load at the node).

More specifically, a segment may include two separate residential sites (e.g., homes, apartment buildings, etc.) each with a separate power generation node (e.g., a PV system, a "grid-tied" battery, a hydroelectric power generation system, a wind turbine, a gas or diesel generator, or the like) and one or more power loads (e.g., devices, appliances, or other systems that utilize power to operate). Alternatively, or in addition, the segment may include a single site with two or more separate power generation nodes and/or some loads. In any event, the current example will be described with reference to a segment that includes at least two nodes; however any number of nodes (e.g., more or less than two) may be included in the grid segment.

The grid segment may be electrically tied to a greater grid (e.g., a utility-managed utility service), and each node may be able to communicate with the message bus configured to provide messages to and from a service provider capable of implementing the features described herein. For example, a server computer system may be configured to collect real-time power generation information for each node within the segment (e.g., the power output of each node may be collected). The server computer system may also be configured to collect aggregate power generation information for the entire segment (in this case, the total loads, the total amount of power generated by the nodes, and/or the total amount of power being supplied by the greater grid). Thus, the service provider may determine, based at least in part on the collected information and one or more greater grid requirements provided by a utility provider, how much power each node should be generating in order to maintain the desired net behavior across the segment.

In some examples, once the service provider (e.g., utilizing the server computer system) determines how much power each node should be generating, the service provider may instruct each node regarding a curtailment point for a time period. For example, the determination may be in real-time, using real-time data, and thus the level of curtailment may only be accurate until the next calculation is made. As such, the instructions provided to each node may include an amount of time for which to curtail the power generation. In some cases, the service provider may be providing new instructions every few seconds, or minutes, in order to maintain the desired net behavior of the grid segment. The instructions may be provided in the form of a control signal that instructs the node on how much power to generate. As noted, the service provider (e.g., utilizing a server computer or the like) may be making the determinations based on the collected information of the segment. This may be beneficial because each node may not be aware of the other power generation systems within the segment, the other loads within the segment, the level of granularity of the segment, and/or the greater grid requirements. In this way, the distributed system, with a service provider controlling the nodes through the message bus, provides enhancements and enables the management of multiple different segments, overlapping segments, subsets of segments, and/or entire greater grids without reprogramming each node or re-equipping each site. In some examples, the distributed system may be configured with one more sensors, meters, and/or gateway devices for communicating the power generation information to and from the service provider and the individual power generation nodes.

Additionally, a power curtailment Message Bus System (MBS) may facilitate communication between various entities in the distributed energy generation/storage deployment, where the entities can include on-site devices, central control systems, user interface systems, logging systems, etc. The MBS may operate according to a subscribe/publish scheme, with each respective device functioning as a subscriber and/or publisher. The MBS employs a message structure comprising a topic component and a device identifier (ID) component. A gateway at each local site may include an MBS client configured to interact with a remote MBS server. In certain embodiments, the site gateway may also include logic implementing priority for communicating messages between the gateway and respective on-site devices. For example, this logic may dictate that the site gateway transmit higher-priority messages for controlling a device, in advance of transmitting lower-priority messages simply requesting data to be acquired from devices (e.g., for routine logging purposes).

For purposes of illustration, several of the examples and embodiments that follow are described in the context of energy generation systems (EGS) that use solar PV technology for energy generation and battery technology for energy storage. However, it should be appreciated that embodiments of the present disclosure are not limited to such implementations. For example, in some embodiments, alternative types of energy generation technologies (e.g., wind turbine, solar-thermal, geothermal, biomass, hydropower, etc.) may be used. In other embodiments, alternative types of energy storage technologies (e.g., compressed air, flywheels, pumped hydro, superconducting magnetic energy storage (SMES), etc.) may be used. One of ordinary skill in the art will recognize many modifications, variations, and alternatives.

In some examples, a curtailment point signal may be provided to a PV inverter for curtailing the power generation of that PV inverter. In this example, the PV inverter may then be limited to generating power at a level based at least in part on the curtailment point. For example, the curtailment point may indicate an amount of power output or a percentage of full capacity for the PV inverter. As noted, in some cases, the curtailment point signal may be communicated to the EGS via the power curtailment MBS. In this way, the logic of the control system may be decoupled from information that identifies how the control signal is to be routed to the particular EGS systems to be curtailed. In some cases, this enables deployment of many EGS devices (e.g., PV inverters or the like), at very large scales, with very limited setup, management of locations, and/or information. Without such a decoupled system, for example, if the control system had to be aware of each individual communication path for each individual EGS device, the control system would need to keep track of specific network, service provider (e.g., cellular provider), and/or address information for each asset (PV invertor, batter, load, etc.). With potentially thousands of such devices, this would be too burdensome of a system to manage. Thus, in some examples, the control service may be unaware of where the individual assets are physically located and/or how to communicate with them. This enables a system that may be geographically dispersed and/or running over various communication protocols or technologies without specific knowledge of those protocols or technologies.

While examples are given with specific numbers or types of example power generation nodes, any number or type of power generation systems may be utilized without departing from the embodiments described herein. Further, while the service provider may be described as using a cloud-based or other type of server computing device, it should be understood that any computing system (including a handheld device or a computing device within close physical proximity of the EGS devices), or combination of computing devices, may be used to collect aggregate power generation information and utility requirements, determine relative amounts of power to be generated by each node, and provide appropriate control signals.

FIG. 1 illustrates example environment 100 for implementing features of the present disclosure. In example environment 100, control server 102 (e.g., of a distributed generation management system service provider), having one or more network interfaces 104 (e.g., a wireless antenna or other wired interface), may be configured to implement or access a message bus 105 over one or more networks 106. In other examples, network 106 may be private and/or control server 102 may be accessible via an Internet Protocol (IP) address without having general Internet access. Example environment 100 also includes a transformer or other high-voltage to lower-voltage conversion device capable of stepping down utility-managed power (e.g., from a great grid or utility service provider) to be provided to one or more components of a segment of components (e.g., particular power generation devices within a location, a set of power generation devices, a neighborhood, etc.). In one example, node 108 represents a connection between the greater grid and a particular segment of a grid of components (lesser grid). Additionally, node 110 may represent a connection at a particular site (e.g., a residence or the like) within the segment. Not all locations within the segment (e.g., other sites connected to node 110) will necessarily include power generation devices (nodes). This example only shows one site connected to node 110; however, other sites could conceivably be part of the lesser grid, as desired.

In some cases, a circuit breaker or other voltage step-down devices may lower the voltage received at node 110 to a manageable voltage for regular appliances or the like. For example, the voltage drop at node 110 may be roughly 220V-240V, while the voltage drop at node 112 may be closer to 110V-120V. In any event, node 112 may represent a connection to an asset (power generation device) 114. For example, asset 114 may be a PV power generation device that can provide power to load 116 (e.g., a hot water heater, a lamp, etc.) of the site at node 112 and/or back to the lesser grid at node 110 and/or the greater grid at node 108. Further, asset 114 may be connected to or otherwise configured with a network interface (here, a wireless antenna) 118 for accessing Internet 106 and/or control server 102 via message bus 105. Similarly, node 108 may be configured with sensor 120 (for collecting input and/or output power information at node 108) that is connected to a network interface (wireless antenna) 122. Network interface 122 may be able to relay the power information collected by sensors 120 to control server 102 via message bus 105 by publishing a message containing the power information to message bus 105. In this way, control server 102 may be able to receive aggregate power information about the segment (lesser grid) from interface 122 (e.g., by subscribing to the message bus 105), receive specific asset 114 power generation information from interface 118 (through message bus 105), determine an appropriate level of power generation for asset 114, and provide a control signal from interface 104 to interface 118 (e.g., utilizing message bus 105) to instruct asset 114 regarding power generation curtailment. Thus, control server 102 is capable of managing the aggregate power of the segment (lesser grid) in real-time by providing real-time instructions to asset 114 at the site through message bus 105.

Figure 2:
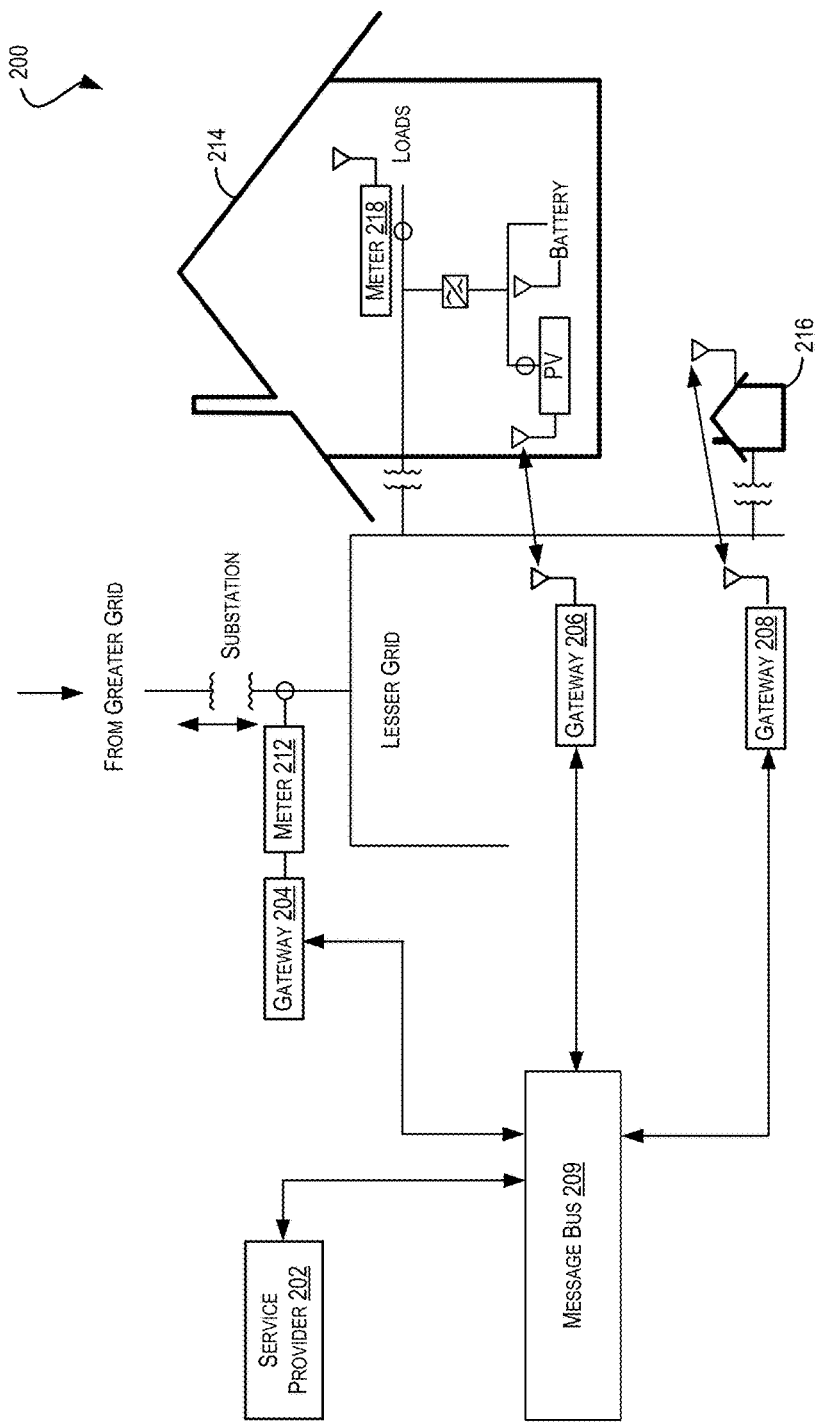
FIG. 2 is another simplified block diagram illustrating at least some features associated with dynamic curtailment of an energy generation system as described herein, according to at least one example.

FIG. 2 illustrates example environment 200 for implementing additional features of the present disclosure. In example environment 200, service provider 202 may be connected to one or more gateway devices 204, 206, 208 via message bus 209. Message bus 209 may be provided over one or more networks that may include any one or a combination of many different types of networks, such as cable networks, the Internet, wireless networks, powerline networks, cellular networks, satellite networks, other private and/or public networks, or any combination thereof.

Similar to as described with respect to FIG. 1, meter 212 may be installed or connected to a power line that feeds power from a greater grid (e.g., the utility service provider or the like) to a lesser grid such as, but not limited to, a neighborhood, a set of homes, a set of businesses, a set of devices within a building, etc. (e.g., through a substation or transformer). While meter 212 is shown just after the substation here (indicating a specific type of segment potentially predefined by the utility service provider), other such meters may be placed anywhere along the greater grid as well as anywhere within the lesser grid, and service provider 202 may be configured to collect power flow through that point and control devices within a subset from that point. In other words, service provider 202 may define a segment that it intends to manage or control based at least in part on the location of this meter. While other meters may exist within the system, at least one meter (here, meter 212) should be the parent meter. Service provider 202 can then control the power at that parent meter by providing instructions to power generation devices that are effectively children nodes from that parent meter (e.g., within the segment that feeds from that parent meter).

In some examples, the power line may carry power from the substation, though meter 212, and then to subsequent sites (e.g., homes, business, public places, etc.) 214, 216 within the lesser grid (segment) intended to be controlled by service provider 202. In some examples, meter 212 may be connected to gateway device 204 configured to communicate power information from meter 212 to service provider 202 via message bus 209. This gateway 204 may act as a master gateway that provides all information to service provider 202 via message bus 209, or it may serve merely to transmit information collected by meter 212. In some embodiments, however, gateway 204 may actually provide information collected by meter 212 to a different master gateway located somewhere else and the different master gateway may provide the power information to message bus 209. Meter 212 may be configured to measure and report power input and output information at its location. In this example, meter 212 is measuring power traveling in and out of the greater grid to the lesser grid.

As noted, the lesser grid (segment under control in this example) may include sites 214, 216, and/or one or more other sites connectible on the power line from the substation. Sites 214, 216 may be configured with one or more assets and/or loads. Assets may include PV systems or other power generation systems and/or battery systems or other energy storage systems. A load may be any power consuming item such as, but not limited to, consumer devices (e.g., electronics, small appliances, etc.), home appliances, electric vehicle charging stations, and/or even battery systems or other energy storage systems. In some examples, each of the loads may have a meter, such as meter 218, with an antenna for communicating with one or more gateway devices, such as gateway 206. Similarly, each of the battery storage devices and/or PV system may have an antenna for communicating with one or more gateway devices, such as gateway 206. As noted, a master gateway (here, gateway 206) may manage communication between one or more devices within a region or location (here, within site 214) and route those communications to either a higher-level master gateway that communicates with message bus 209 or it may route those communications directly to message bus 209 itself. As desired, any number of gateways may be used, at various locations and/or distances, depending on the types of network connections, bandwidth concerns, antenna and/or signal strength, distance between devices, and/or gateway ranges.

As such, and potentially independent of the configuration of the gateways, each asset and/or load within a site may be able to provide power information to service provider 202 and receive control signals for managing power from service provider 202 via message bus 209. It may also be possible, for site 216 to have a single antenna and communicate with a single gateway 208 for communicating individual asset and/or load power information. For example, the information may be in a table or other data structure and may include individual asset and/or load information with device identifiers or the like. The device identifiers may be used by service provider 202 to attribute power information to appropriate devices within site 216, even when the assets themselves are not reporting directly. Alternatively, in some examples, Ethernet or other network cabling (e.g., using standard routers, Internet service providers, or the like), cellular network technologies, and/or powerline carrier technology with one or more receivers (e.g., sending and receiving the data through the copper wire used to transmit the power) could be used to communicate the power information to message bus 209.

In some examples, service provider 202 may be configured to receive the power information from individual assets and/or loads of a single site (e.g., site 214) through a subscription to message bus 209, and also from individual assets and/or loads of other sites (e.g., site 216) within the lesser grid or within any defined region or sub-region of the greater grid. As such, multiple different sites 214, 216, etc., may be managed together in real-time to control the net power flow within that defined region. In some cases, service provider 202 may calculate a power profile for the defined region (here, the lesser grid) that will satisfy real-time power generation requirements or real-time power goals for the region under control. The power profile may be calculated based on a magnitude of power goals for the defined region. In this case, only a sufficient number of sites 214, 216 must be controlled so that it will be possible to attain the goal. For example, if the goal is to curtail power generation by 2% of the total net for the region, service provider 202 should at least have control of enough assets that dropping the total output of the controlled assets would affect the net by 2% or more. Any percentage or number of devices under control of service provider 202 that will allow service provider 202 to affect the net power profile enough to reach the goal will suffice. As such, the number or percentage of sufficient devices may change over time as the goals and/or requirements change, and as the number of devices under control of service provider 202 change.

In some examples, the target power profile for the region under control may be fixed, it may be a value that changes over time, it may be dynamic (e.g., based at least in part on real-time factors), or it may be based on a control signal provided by a utility service provider (e.g., that controls the greater grid). For example, the utility provider may have upstream information that tells them how much power can be flowing at any time, and they may want to set the profile based on that information (which may be arbitrary from the perspective of service provider 202). The power profile could be fixed at zero (0), indicating that the defined region under control by service provider 202 can never export power to the greater grid. The power profile could be set at some fixed number that indicates an amount of power to import (or export) that must at least occur at all times from (or to) the greater grid. In some examples, a control signal may be received from a utility provider that indicates how much power a system should output, where the system in this case would be the region under control of service provider 202 (i.e., the lesser grid of FIG. 2). In some cases, the power profile could be a single static set point (e.g., a particular invertor should be set to a power point of 5 kilowatts), it could be a time-varying profile, or it could be based on some locally measured value (e.g., Voltage). Further, control signals may vary, depending on the assets being controlled and/or the granularity of the control (e.g., whether an asset or an entire site with various assets is being controlled), such that a control signal may provide specific instructions for kilowatt output, voltage readings, amounts of storage, or it may provide percentage and direction of control (e.g., increase by 10%, decrease by 25%, etc.).

Figure 3:
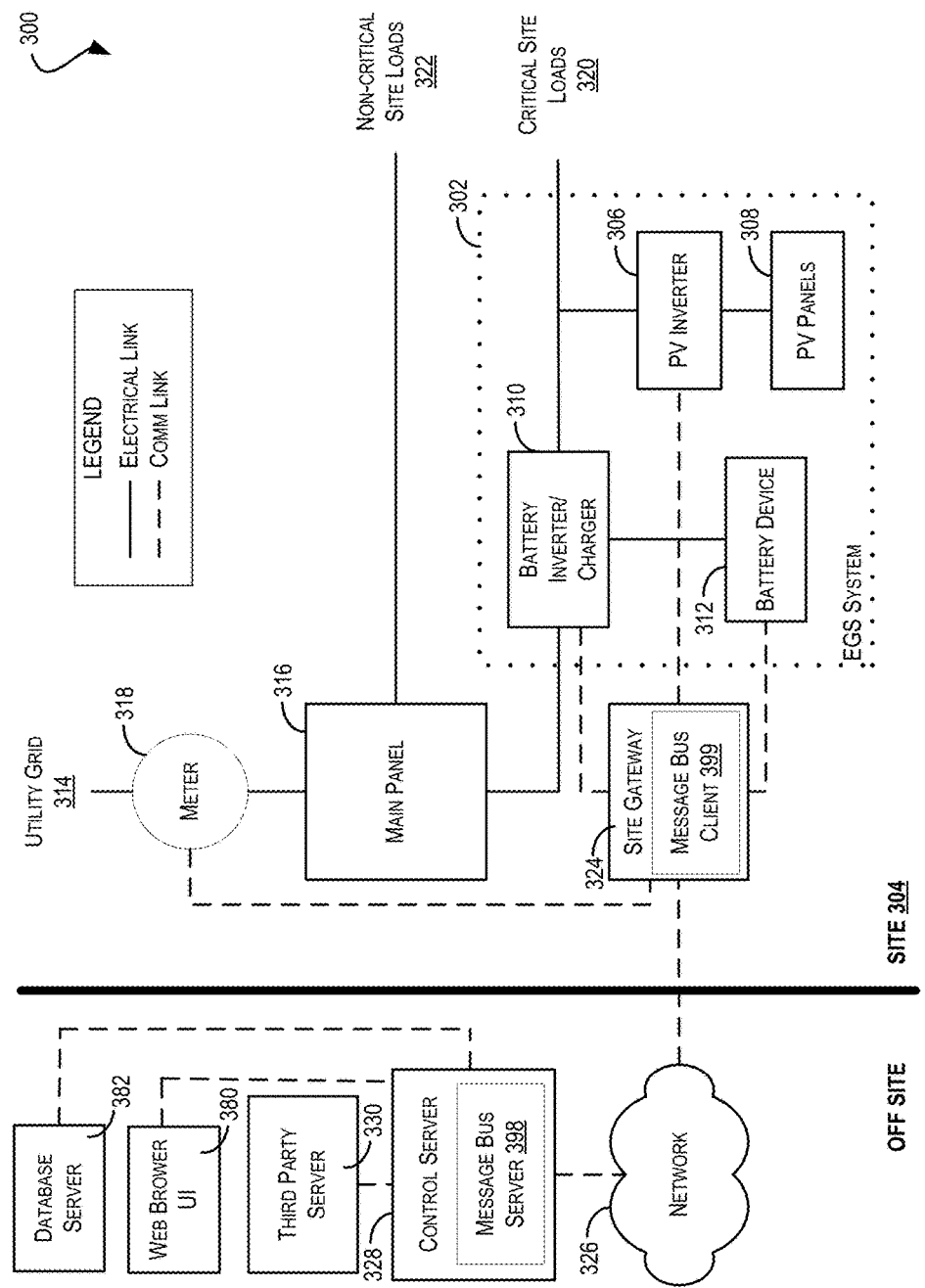
FIG. 3 is another simplified block diagram illustrating at least some additional features associated with dynamic curtailment of an energy generation system as described herein, according to at least one example.

FIG. 3 is a simplified block diagram of system environment 300 according to an embodiment of the present disclosure. As shown, system environment 300 includes an energy generation and storage (EGS) system 302 that is installed at site 304 (e.g., a residence, a commercial building, etc.). EGS system 302 may include a PV-based energy generation subsystem comprising PV inverter 306 and one or more PV panels 308, as well as a battery-based energy storage subsystem comprising battery inverter/charger 310 and/or battery device 312. In some embodiments, PV inverter 306 and battery inverter/charger 310 can be combined into a single device. In the example of FIG. 3, EGS system 302 may be grid-connected; thus, PV inverter 306 and battery inverter/charger 310 may be electrically connected to the utility grid (greater grid), for example, via main panel 316 and utility meter 318. Further, to provide power to site 304, utility grid 314, PV inverter 306, and/or battery inverter/charger 310 may be electrically connected to critical site loads 320 and/or non-critical site loads 322.

In some examples, integrated EGS systems such as system 302 may provide a number of advantages over energy generation systems that do not incorporate any on-site energy storage. For example, excess energy produced by PV components 306 and 308 can be stored in battery device 312 via battery inverter/charger 310 as a critical reserve. Battery inverter/charger 310 can then discharge this reserved energy from battery device 312 when utility grid 314 is unavailable (e.g., during a grid blackout) to provide backup power for critical site loads 320 until grid power is restored. As another example, battery device 312 can be leveraged to "time shift" energy usage at site 304 in a way that provides economic value to the site owner or the installer/service provider of EGS system 302. For instance, battery inverter/charger 310 can charge battery device 312 with energy from utility grid 314 (and/or PV inverter 306) when grid energy cost is low. Battery inverter/charger 310 can then dispatch the stored energy at a later time to, e.g., offset site energy usage from utility grid 314 when PV energy production is low/grid energy cost is high, or sell back the energy to the utility when energy buyback prices are high (e.g., during peak demand times).

Unfortunately, centralized management of EGS systems such as system 302 has proven to be difficult, particularly at the large scale needed for the residential and commercial markets. To address this, system environment 300 can include site gateway 324 and control server 328. Site gateway 324 may be a computing device (e.g., a general purpose personal computer, a dedicated device, etc.) that is installed at site 304. As shown, site gateway 324 may be communicatively coupled with on-site components 306, 310, 312, and 318, as well as with control server 328 via network 326. In one embodiment, site gateway 324 can be a standalone device that is separate from EGS system 302. In other embodiments, site gateway 324 can be embedded or integrated into one or more components of system 302. Control server 328 may be a server computer (or a cluster/farm of server computers) that is remote from site 304. Control server 328 may be operated by, e.g., the installer or service provider of EGS system 302, a utility company, or some other entity.

In one embodiment, site gateway 324 and control server 328 can carry out various tasks for monitoring the performance of EGS system 302. For example, site gateway 324 can collect system operating statistics, such as the amount of PV energy produced (via PV inverter 306), the energy flow to and from utility grid 314 (via utility meter 318), the amount of energy stored in battery device 312, and so on. Site gateway 324 can then send this data to control server 328 for long-term logging and system performance analysis.

More significantly, site gateway 324 and control server 328 can operate in tandem to actively facilitate the deployment and control of EGS system 302. Specifically, FIG. 3 shows other entities remote from the site (OFF SITE), that may communicate with EGS system 302. These other entities may include web server 380 and database server 382.

According to embodiments, communication between the various elements involved in power management (e.g., between the centralized control server and the various devices at the remote site, and/or between the centralized control server and various other remote devices such as the database server, web server, etc.) may be achieved through use or implementation of a power management Message Bus System (MBS). In the simplified view of FIG. 3, the MBS is implemented utilizing message bus server 398, and message bus client 399 located at the site gateway. In other words, the distributed energy generation management system may implement an MBS to communicate with the respective assets and/or energy generation systems of the DGMS. In some examples, implementation of the MBS may include controlling or otherwise managing the message server, establishing topics for subscription, and/or hosting the MBS on a computing system under the control of the DGMS system, or the like. In FIG. 3, message bus server 398 is shown as being on the control server, but this is not required and in some embodiments message bus server 398 can be on a separate machine and/or part of a separate server cluster.

The power management MBS as described herein, facilitates communication between the various entities (e.g., on-site devices, central control systems, distributed control systems, user interface systems, logging systems, third party systems etc.) in a distributed energy generation and/or storage deployment. The MBS operates according to a subscribe/publish model, with each respective device functioning as a subscriber and/or publisher, utilizing a topic of a message being communicated.

The presence of the power management MBS introduces flexibility into the communication of messages through the power management system. In particular, the individual devices themselves are permitted to publish and subscribe according to message topic. This approach lessens the burden on control server 328 and avoids potential bottlenecks to communication. Utilization of the power management MBS also serves to enhance the availability and visibility of the communicated information, because messages are published and hence available to all subscribing entities. Further details regarding the power management MBS are provided below in connection with FIG. 4.

It should be appreciated that system environment 300 is illustrative and not intended to limit embodiments of the present disclosure. For instance, although FIG. 3 depicts control server 328 as being connected with a single EGS system 302 at a single site 304, server 328 can be simultaneously connected with a fleet of EGS systems that are distributed at multiple sites. In these embodiments, control server 328 can coordinate the scheduling of these various systems/sites to meet specific goals or objectives. In further embodiments, the various components depicted in system 300 can have other capabilities or include other subcomponents that are not specifically described. Furthermore, multiple instances and variants of the control server may exist, each communicating with one or more other control servers, EGS systems and/or other devices connected to EGS system 304. One of ordinary skill in the art will recognize many variations, modifications, and alternatives.

Figure 4:
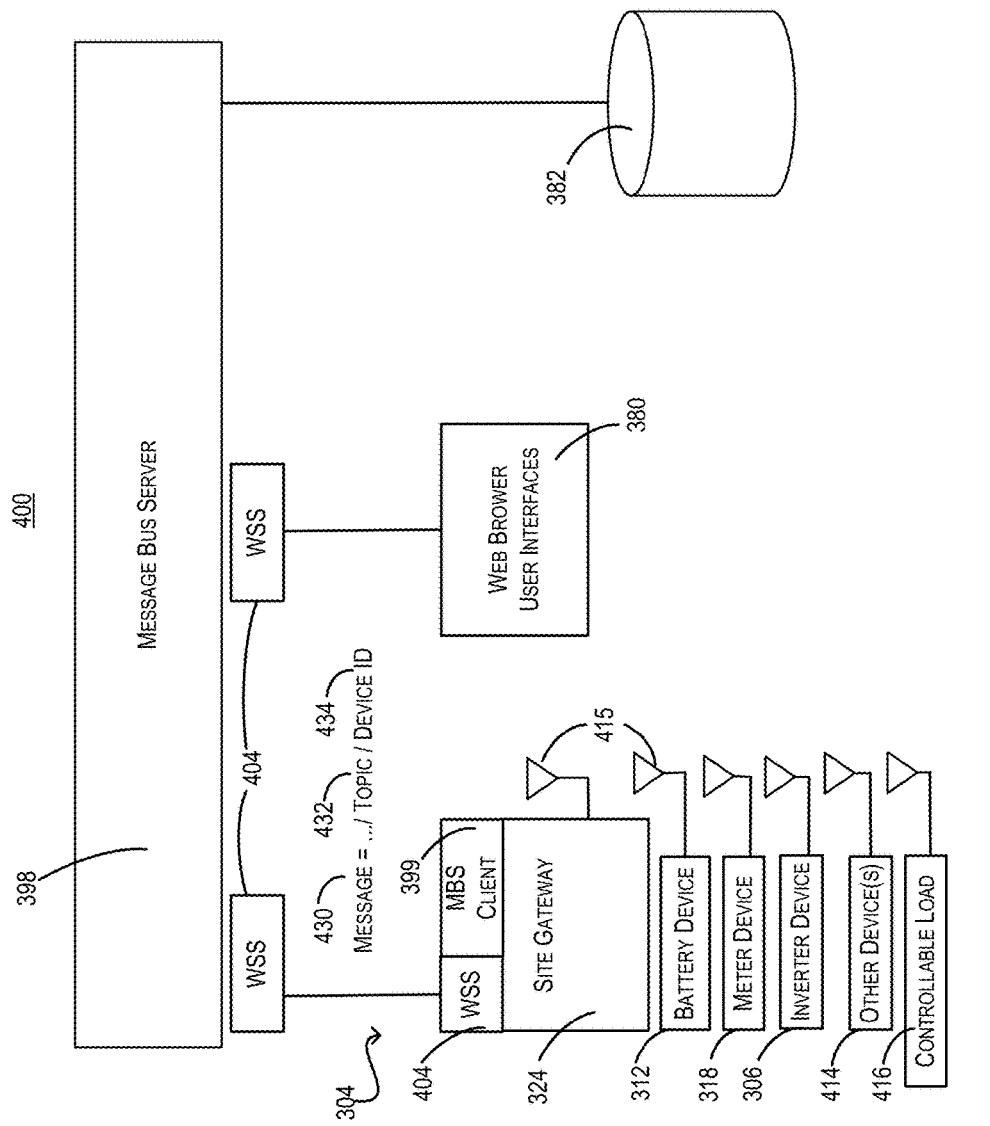
FIG. 4 is a simplified block diagram illustrating a message bus architecture for the dynamic curtailment of an energy generation system as described herein, according to at least one example.

Additional details regarding embodiments of a power management MBS are now described in FIG. 4. In particular, power management MBS 400 comprises a centralized bus that is in communication with the local power generation and/or storage site 304 through various servers, including message bus server 398 and Websocket Server (WSS) 404. This configuration allows use of the Websocket web browser standard communication protocol, in order to communicate between embedded gateways and the MBS server. Here, the MBS server, MBS client, and WSS may be implemented by software.

It is noted, however, that embodiments are not limited to use of the Websocket communication protocol, or to any other specific communication protocol. Examples of communication protocols which could be utilized by a power management MBS according to embodiments, can include, but are not limited to, high messaging protocols such as AQMP, MQTT, or STOMP, XMPP, HTTP, TCP, UDP.

FIG. 4 shows details of the power generation and/or storage site. In particular, also shown are site gateway 324, WSS 404, and MBS client 399 through which the gateway may be in communication with the server-side component of the MBS.

FIG. 4 also shows respective local devices 312, 318, 306, and 414 with which site gateway 324 may be in contact. Examples of these devices can include, but are not limited to, photovoltaic (PV) battery device 312, meter device 318, inverter device 306, as well as other device(s) 414.

Site gateway 324 may be in contact with the various devices through a wired and/or wireless network. Specifically shown in this embodiment, is contact between site gateway 324 and the various devices via radio frequency (RF) communication through antennae 415.

However, embodiments are not limited to this particular form of communication and others are possible. Examples of types of communication which may be affected between site gateway 324 and various devices can include, but are not limited to, wired communication (e.g., Ethernet, CAN, RS232, RS485, etc.) and/or wireless communication (e.g., ZigBee, Wi-Fi, cellular, etc.).

FIG. 4 also shows site gateway 324 as being in communication with controllable load 416. Such controllable load 416 may comprise for example, an air-conditioner, fan, or other apparatus which draws power that is generated and/or stored, and which can be activated/de-activated by message command.

FIG. 4 further shows web browser user interfaces 380 in communication with MBS server 398 via a respective WSS 404. This web browser interface 380 may allow a user to send (publish) and receive (subscribe) messages to/from the power generation and/or storage site.

Multiple such web browser interfaces are possible. For example, one web browser interface may be available for use by the owner of the site, e.g., a residential homeowner on whose roof the PV devices may be installed.

Another web browser interface may be available to a site administrator. The administrator could utilize the web browser interface to interrogate and control the devices in order to manage safety and effective generation and/or storage of power at the site.

MBS server 398 may be further in communication with database 382. This database 382 may be responsible for storing information relevant to operation of the EGS system across one or more of the sites. Database 382 may store information regarding performance attributes of various devices of this and other EGS systems.

Also shown in FIG. 4 is message 430 that is communicated utilizing MBS server 398. This message 430 has a specific structure determined by the communications protocol being employed. It typically includes at least topic 432 component indicating the nature of message 430. The topic may include device identifier (ID) 434 component indicating a device identity. Message 430 may further comprise a subscriber component indicating those subscribers or types of subscribers who are entitled to receive message 430.

In particular, MBS server 398 may utilize a topic-based publish/subscribe model for communication. According to such a publish/subscribe model, subscribers subscribe to specific topics in which they are interested. As discussed below, in certain embodiments these topics may be organized according to a hierarchy.

This subscription logic can be handled by a separate software component in MBS client 399 for each site device (in the case of on-site subscribers). This subscription information may be persisted by MBS server 398.

Publishers publish to predefined topics about which they are configured to disseminate information. This publishing logic could again be handled by separate software components in MBS client 399 for each site device. In certain embodiments, the software components handling publication may be the same components as the subscription components.

Upon publication, based on the message topic, MBS server 398 may consult the subscription information. MBS server 398 then delivers the message to those devices subscribing to that particular topic.

Figure 5:
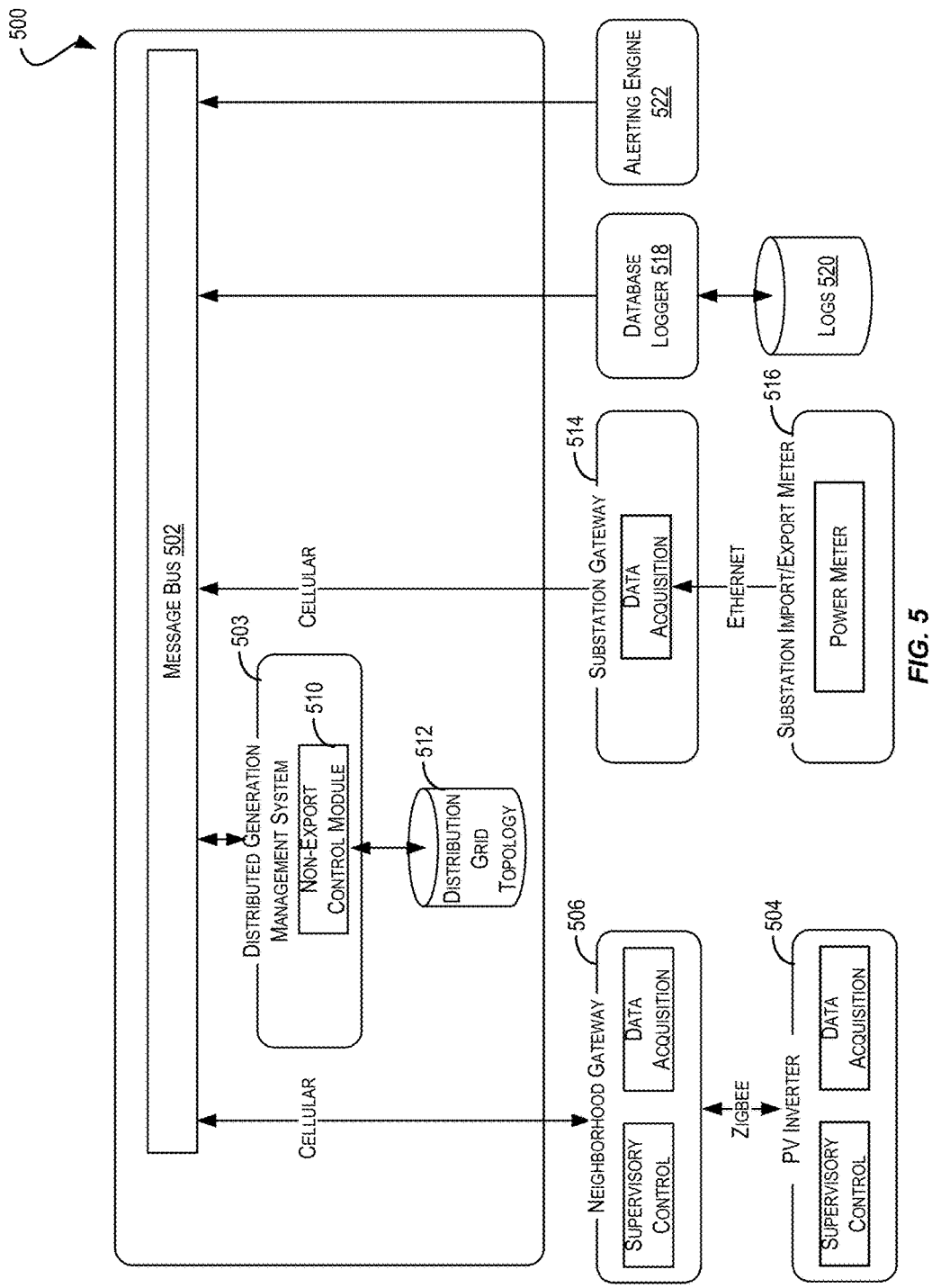
FIG. 5 is another simplified block diagram illustrating additional features of a message bus architecture for the dynamic curtailment of an energy generation system as described herein, according to at least one example.

FIG. 5 illustrates a non-limiting example 500 for utilizing message bus 502 to curtail power generation of PV inverter 504 that is part of a distributed generation management system 503. As illustrated, PV inverter 504 may include some supervisory control and data acquisition functionality, and may be connected to message bus 502 by a wireless network connection (e.g., cellular or the like). Additionally, PV inverter 504 may be connected to a neighborhood gateway 506 via Zigbee or other wireless connection. Neighborhood gateway 506 may also include supervisory controls and/or data acquisition functionality, and may be configured to communicate with one or more other PV inverters or other power generation assets or loads within the neighborhood.

Message bus 502 may be managed or otherwise controlled by distributed generation management system 503, which may include non-export control module 510 and/or may be coupled to a distribution grid topology (e.g., for storing information about each neighborhood grid (lesser grid)). Additionally, message bus 502 may also be in communication with substation gateway 514, which may include data acquisition functionality and may also be connected to one or more power meters of substation import/export meter 516. Substation import/export meter 516 may be capable of reading the import and export levels for the substation and may also receive signals from the utility provider indicating import/export requirements. In some cases, the utility provider may require that no power is exported to the greater grid (e.g., the sum of PV inverter 504 power generation should never exceed the sum of the loads in the neighborhood). Similar to neighborhood gateway 506, substation gateway 514 may be connected to message bus 502 via a cellular connection or the like.

Message bus 502 may also be connected to database logger 518, which may log every (or at least a subset of every) message that passes through message 502 in log file 520 (log database). Database logger 518 may subscribe to all messages of message bus 502. Additionally, message bus 502 may be connected to alerting engine 522 configured to track actions and/or power levels and provide alerts (e.g., emails or other electronic messages) to users and/or administrators of distributed generation management system 503. Alerting engine 522 may also subscribe to all messages and may publish alerts when appropriate.

In one non-limiting example, neighborhood gateway 506 may subscribe (with message bus 502) to messages regarding power curtailment for PV inverter 504 and may publish messages regarding power output of PV inverter 504 to message bus 502. Additionally, substation gateway 514 may subscribe (with message bus 502) to power output messages originating from PV inverter 514 and may publish curtailment control signals to message bus 502 when appropriate. Substation gateway 514 may also publish other control signals, power profiles, and/or set points. In some cases, the power profile may provide instructions for PV inverter 504, instructing PV inverter 504 when to stop generating power or to generate power at some percentage of the capability of PV inverter 504. Distributed generation management system 503 may also subscribe to both information from neighborhood gateway 506 and substation gateway 514. In at least one example, substation gateway 514 may publish a utility requirement and neighborhood gateway 506 may publish real-time power generation information of PV inverter 504. Through the subscription, distributed generation management system 503 may receive both sets of information. In some cases, system 510 may determine, based at least in part on the power generation information of PV inverter 504 that an overgeneration condition is occurring. In response, system 503 may generate a curtailment control signal and publish it to message bus 502. Through its subscription for such information, neighborhood gateway 506 may receive the control signal and provide it to PV inverter 504 to curtail the power generation for a period of time or at least until the next control signal is received. In this way, message bus 502 and appropriate subscriptions by the entities may enable the real-time curtailment of power generation by PV inverter 504 as desired.

Figure 6:
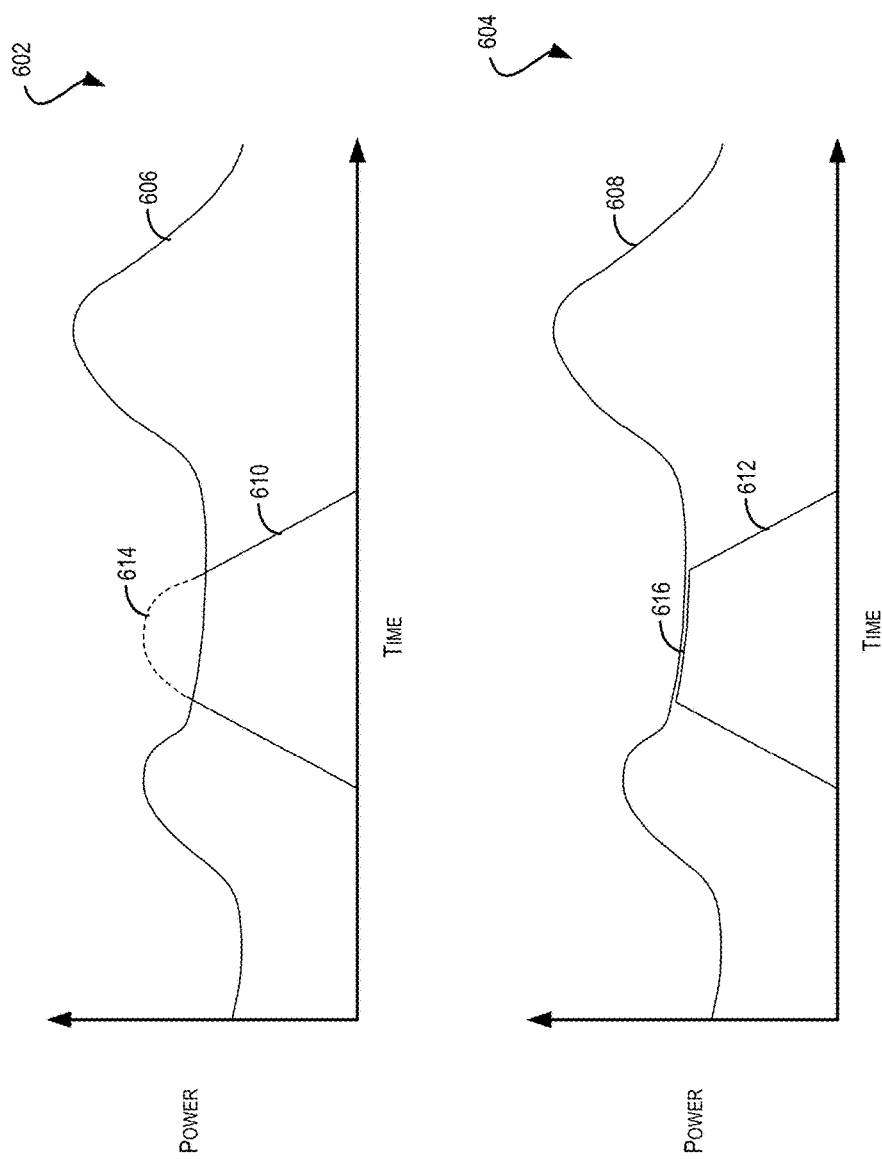
FIG. 6 is a simplified graph diagram illustrating example data associated with dynamic curtailment of an energy generation system as described herein, according to at least one example.

FIG. 6 shows line graphs 602 and 604 for illustrating example aggregate loads for a distributed generation management system. Each of graphs 602 and 604 plot power over time for a grid (e.g., a lesser grid or segment of a grid that is being controlled). In each graph, there are slight peaks of power usage in the morning (e.g., while most people are getting ready for work or school) and then in the evening (e.g., while most people are returning home from work or school and potentially making dinner, socializing, etc.) as represented by plots 606 and 608, respectively. The graphs 602 and 604 also show plots 610 and 612, respectively, which illustrate power over time for an example PV inverter. Since the PV inverter is likely only generating power during the afternoon, with peak generation at the height of the day (e.g., when the sun is brightest and/or most directly overhead), plots 610 and 612 show how there may be overgeneration conditions around noon (illustrated by the dashed line 614 of graph 602). In some examples, when this is detected, the distributed generation management system may generate a curtailment control signal that instructs the PV inverter to track the aggregate load 608, as seen by the line 616 of graph 604. In this case, the overgeneration condition may be curtailed by publishing a control signal to the message bus described above and by enabling a gateway device associated with the PV inverter (or the PV inverter itself) to subscribe to such information.

Figure 7:
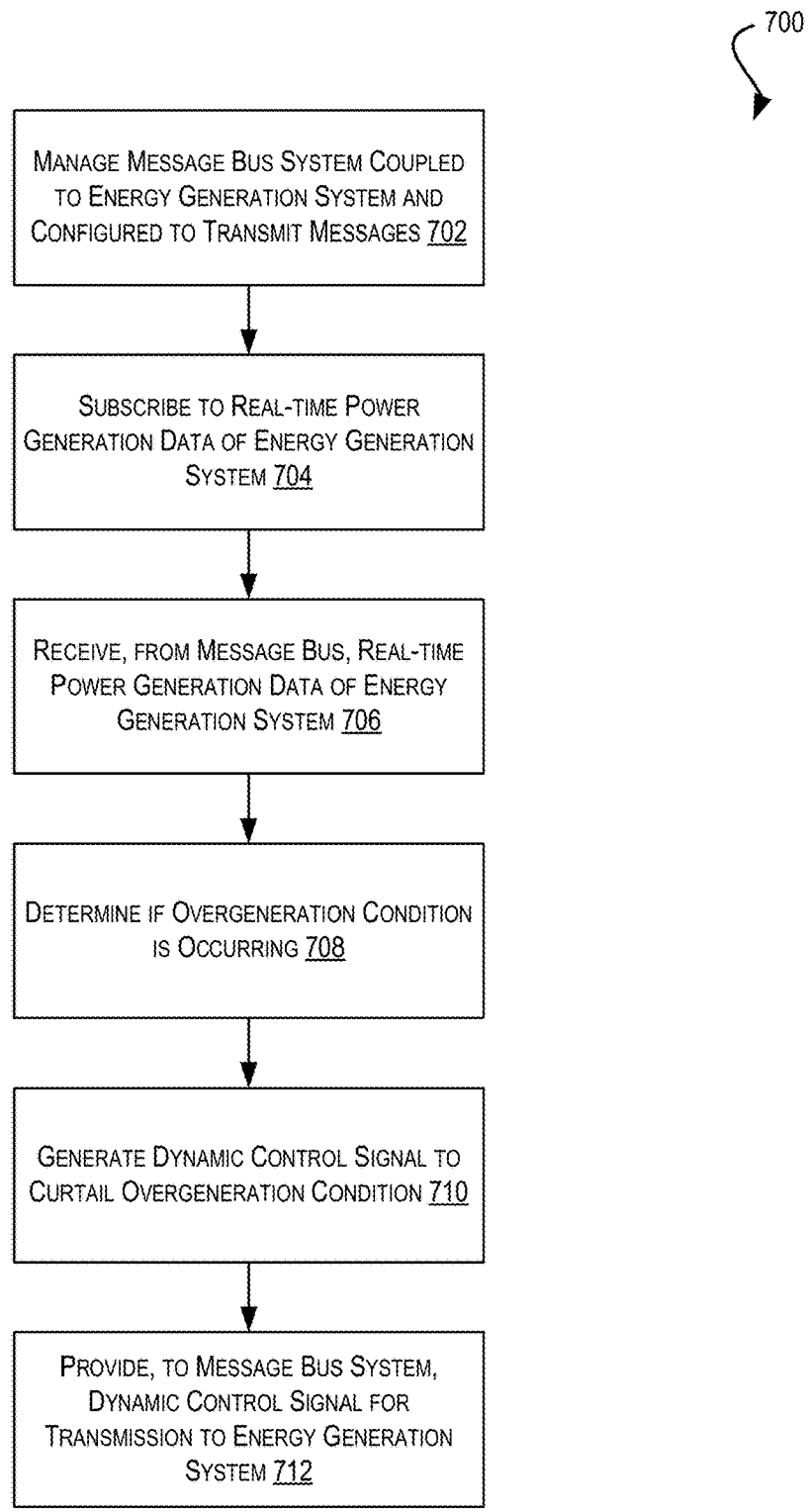
FIG. 7 is a simplified flow diagram illustrating at least one method for dynamic curtailment of an energy generation system as described herein, according to at least one example.

FIG. 7 illustrates an example flow diagram showing method 700 for curtailing an energy generation system utilizing a message bus system, as described herein. This method 700 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the method.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, one or more processors of control server 102 of FIG. 1 or service provider 202 of FIG. 2 may perform method 700 of FIG. 7. Method 700 may begin at 702, where a message bus system may be managed. The message bus system may be coupled to one or more energy generation systems (e.g., a PV inverter or the like), a control server (e.g., a service provider computer of a distributed generation management system), and/or a load metering device (e.g., a load monitor or other meter situated at a load of the system or at import/export node of the segment of grid under control). The message bus may also be configured to transmit messages and enable entities to subscribe to such messages, as appropriate. At 704, real-time power generation data may be subscribed to. The real-time power generation data may correspond to the energy generation system. In other words, the subscription may be for real-time information that indicates how much power a PV inverter is generating (e.g., at all times or at least during certain times of the day).

At 706, the real-time power generation data of the energy generation system may be received via the message bus system. In this way, and through the subscription, the appropriate messages may be received when they are transmitted over the message bus. If the subscription were not in place, the messages might travel through the bus without being received by the distributed generation management system. At 708, it may be determined (e.g., based at least in part on the real-time power generation information and/or real-time load information) whether an overgeneration condition is occurring. At 710, if the overgeneration condition is occurring, a dynamic control signal to curtail the overgeneration condition may be generated. The dynamic control signal may instruct the energy generation system to curtail its own power generation for a period of time. At 712, the dynamic control signal may be provided (published) to the message bus system for transmission to the energy generation system (and eventually to the PV inverter of that energy generation system). In some examples, method 700 may also include receiving, from the message bus system, information that indicates that the system load metering device has detected a period of time when the system load is below a threshold corresponding to an amount of power provided by the energy generation system. Method 700 may also include receiving, from the message bus system, an amount of power required by the system load for the period of time, where the dynamic control signal is provided to the message bus system for curtailing the overgeneration of power during the period of time. Further, in some cases, the dynamic control signal may be configured to instruct a power generation asset of the one or more energy generation systems to decrease power production based at least in part on the system load.

Figure 8:
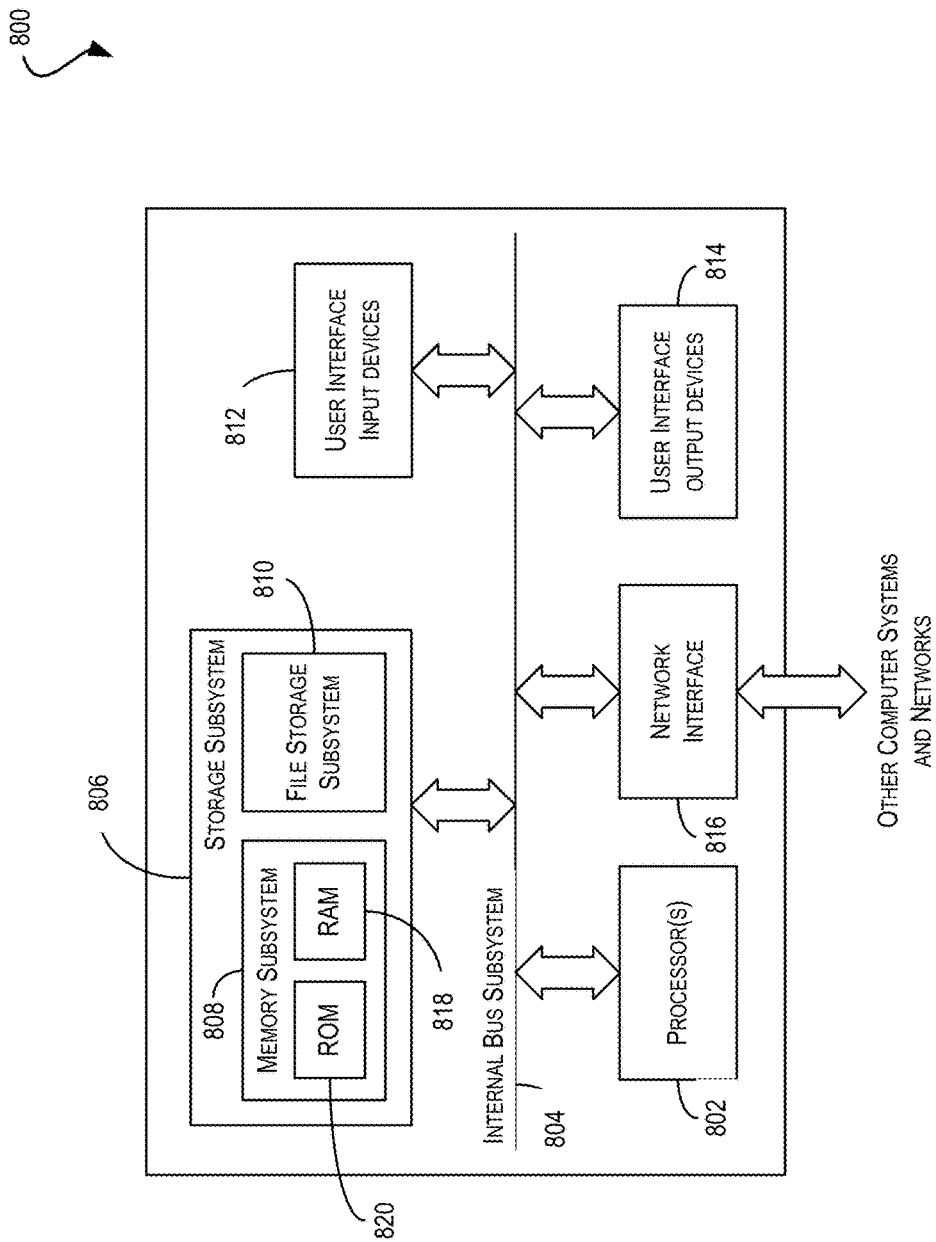
FIG. 8 depicts a simplified block diagram of a computing system for implementing some of the examples described herein, according to at least one example.

FIG. 8 is a simplified block diagram of computer system 800 according to an embodiment of the present disclosure. Computer system 800 can be used to implement any of the computer systems/devices (e.g., control server 102, service provider 202, gateway devices) described with respect to FIGS. 1-3. As shown in FIG. 8, computer system 800 can include one or more processors 802 that communicate with a number of peripheral devices via a bus subsystem 804. These peripheral devices can include storage subsystem 806 (comprising memory subsystem 808 and file storage subsystem 810), user interface input devices 812, user interface output devices 814, and a network interface subsystem 816.

In some examples, internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses. Additionally, network interface subsystem 816 can serve as an interface for communicating data between computer system 800 and other computer systems or networks (e.g., the Internet of FIG. 1 and/or network 210 of FIG. 2). Embodiments of network interface subsystem 816 can include wired interfaces (e.g., Ethernet, CAN, RS232, RS485, etc.) or wireless interfaces (e.g., ZigBee, Wi-Fi, cellular, etc.).

In some cases, user interface input devices 812 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800. Additionally, user interface output devices 814 can include a display subsystem, a printer, or non-visual displays such as audio output devices, etc. The display subsystem can be any known type of display device. In general, use of the term "output device" is intended to include all possible types of devices and mechanisms for outputting information from computer system 800.

Storage subsystem 806 can include memory subsystem 808 and file/disk storage subsystem 810. Subsystems 808 and 810 represent non-transitory computer-readable storage media that can store program code and/or data that provide the functionality of embodiments of the present disclosure. In some embodiments, memory subsystem 808 can include a number of memories including main random access memory (RAM) 818 for storage of instructions and data during program execution and read-only memory (ROM) 820 in which fixed instructions may be stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than system 800 are possible.

Illustrative methods and systems for managing user device connections are described above. Some or all of these systems and methods may, but need not, be implemented at least partially by architectures such as those shown at least in FIGS. 1-7 above. While many of the embodiments are described above with reference to alerts and/or notifications, it should be understood that any type of electronic content may be managed using these techniques. For example, a first telephone call may be being presented, when a different incoming telephone call is received. Based at least in part on the techniques described herein, a user device may be able to determine whether to answer the incoming call and hold the first call, ignore the incoming call, overlay the incoming call, displace the initial call, or the like based at least in part on categories of the call (e.g., time of day, area code, calling party, etc.) or the like. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for curtailing, by a server, overgeneration of power, comprising:
    implementing, by the server, a message bus system operating under a subscribe/publish scheme that is coupled to an energy generation system and a system load metering device configured to measure a system load corresponding to the energy generation system, the message bus system configured to transmit messages between at least one of the energy generation system, the system load metering device, or the server;
    subscribing, with the message bus system, to real-time power generation data of the energy generation system;
    receiving, from the message bus system, the real-time power generation data of the energy generation system;
    determining, based at least in part on the real-time power generation data of the energy generation system, if the energy generation system is experiencing an overgeneration condition, the overgeneration condition occurring when the energy generation system produces more power than is required by a system load corresponding to the system load metering device;
    generating a dynamic control signal to curtail the overgeneration condition based at least in part on the real-time power generation data; and
    publishing, to the message bus system, the dynamic control signal for transmission to the energy generation system, the dynamic control signal being configured to instruct a power generation asset of the one or more energy generation systems to decrease power production by an amount that is based at least in part on the system load.

2. The method of claim 1, further comprising receiving, from the message bus system, information that indicates that the system load metering device has detected a period of time when the system load is below a threshold corresponding to an amount of power provided by the energy generation system.

3. The method of claim 2, further comprising receiving, from the message bus system, an amount of power required by the system load for the period of time.

4. The method of claim 2, wherein the dynamic control signal is provided to the message bus system for curtailing the overgeneration of power during the period of time.

5. A system, comprising a server computer with a processor configured to execute computer-executable instructions, stored in a memory of the server computer, to:
    implement a message bus system operating under a subscribe/publish scheme;
    subscribe, via a network, to power generation data of the message bus system associated with an energy generation system, the message bus system configured to manage messages between at least one of the energy generation system, a system load metering device configured to measure a system load associated with the energy generation system, or the server computer;
    receive, from the message bus system, the power generation data of the energy generation system;
    receive, from the message bus system, an amount of power that is required by the system load;
    determine, based at least in part on the power generation data of the energy generation system, whether the energy generation system is experiencing an overgeneration condition, the overgeneration condition occurring when the energy generation system produces more power than the amount of power that is required by the system load corresponding to the system load metering device;

generate, by the server computer, a dynamic control signal configured to curtail the overgeneration condition of the energy generation system based at least in part on the power generation data when the energy generation system is experiencing the overgeneration condition; and publish, to the message bus system, the dynamic control signal for communication to the energy generation system, the dynamic control signal being configured to instruct a power generation asset of the one or more energy generation systems to decrease power production by an amount that is based at least in part on the system load.

6. The system of claim 5, wherein the power generation data corresponds to an asset of the energy generation system.

7. The system of claim 6, wherein the dynamic control signal is further configured to instruct the asset to decrease an amount of power generation.

8. The system of claim 6, wherein the asset is configured to control power generation of the energy generation system.

9. The system of claim 6, wherein the asset comprises a photovoltaic inverter.

10. The system of claim 5, wherein the network comprises at least one of a wireless network, a wired network, or a power line network.

11. The system of claim 5, wherein the processor is further configured to execute the computer-executable instructions to determine, based at least in part on the power generation data of the energy generation system, whether the energy generation system is experiencing the overgeneration condition.

12. The system of claim 11, wherein the overgeneration condition occurs when the energy generation system produces more power than is required by a system load corresponding to the system load metering device.

13. The system of claim 12, wherein the processor is further configured to execute the computer-executable instructions to receive an amount of power that is required by the system load.

14. The method of claim 5, wherein the message bus system receives the power generation data of the energy generation system from a gateway device that collects the power generation data from at least the subset of the plurality of energy generation systems.

15. The method of claim 14, wherein the gateway device is capable of receiving the power generation data via a wireless interface of the network.

16. A non-transitory computer-readable storage medium configured to store computer-readable instructions that, when executed by one or more processors of a server, configure the one or more processors to perform operations comprising:

implementing a message bus system operating under a subscribe/publish scheme;

subscribing, with the message bus system configured to manage messages between at least one of an energy generation system, a system load metering device configured to measure a load of a system associated with the energy generation system, or the server, to real-time power generation data of the energy generation system;

receiving, from the message bus system, the real-time power generation data of the energy generation system;

receiving, from the message bus system, an amount of power that is required by the system load;

determining, based at least in part on the real-time power generation data of the energy generation system, whether the energy generation system is experiencing an overgeneration condition, the overgeneration condition occurring when the energy generation system produces more power than the amount of power that is required by the system load corresponding to the system load metering device;

generating, by the server, a dynamic control signal configured to curtail the overgeneration condition of the energy generation system based at least in part on the real-time power generation data if the energy generation system is experiencing the overgeneration condition; and publishing, to the message bus system, the dynamic control signal for transmission to the energy generation system, the dynamic control signal being configured to instruct a power generation asset of the one or more energy generation systems to decrease power production by an amount that is based at least in part on the system load.

17. The non-transitory computer-readable storage medium of claim 16, wherein the operations further comprise providing the message bus system for subscription to at least one of the energy generation system or the system load metering device.

* * * * *